O. A. ANDERSON.
RIVETING MACHINE.
APPLICATION FILED MAY 17, 1909.
945,670.
Patented Jan. 4, 1910.
2 SHEETS—SHEET 1.
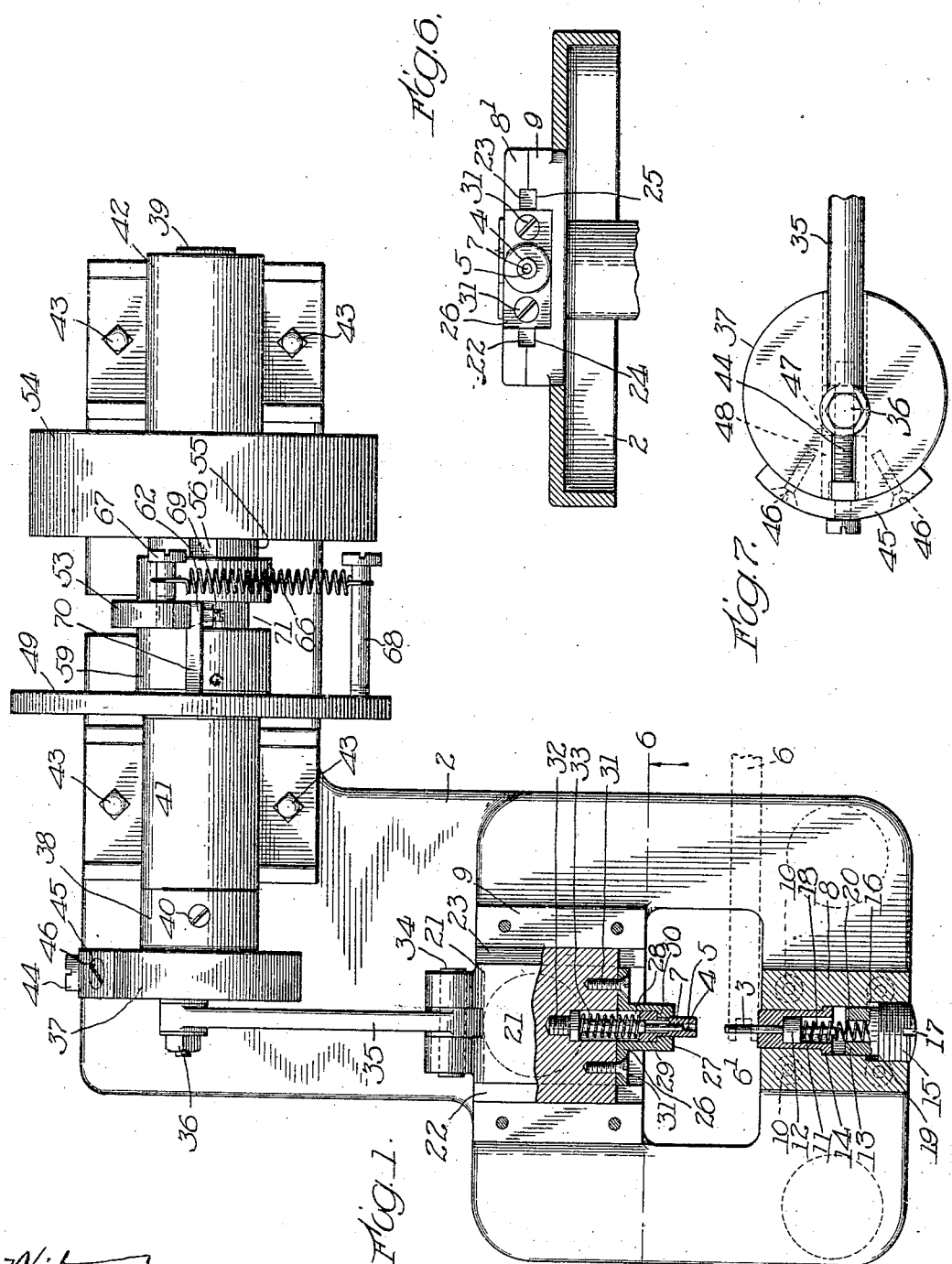
Witnesses:
Robert H. Weir
Seymour S. Gilbert
Inventor:
Oscar A. Anderson
By Warner Peckatrom
His Atty O. A. ANDERSON.
RIVETING MACHINE.
APPLICATION FILED MAY 17, 1909.
945,670.
Patented Jan. 4, 1910.
2 SHEETS—SHEET 2.
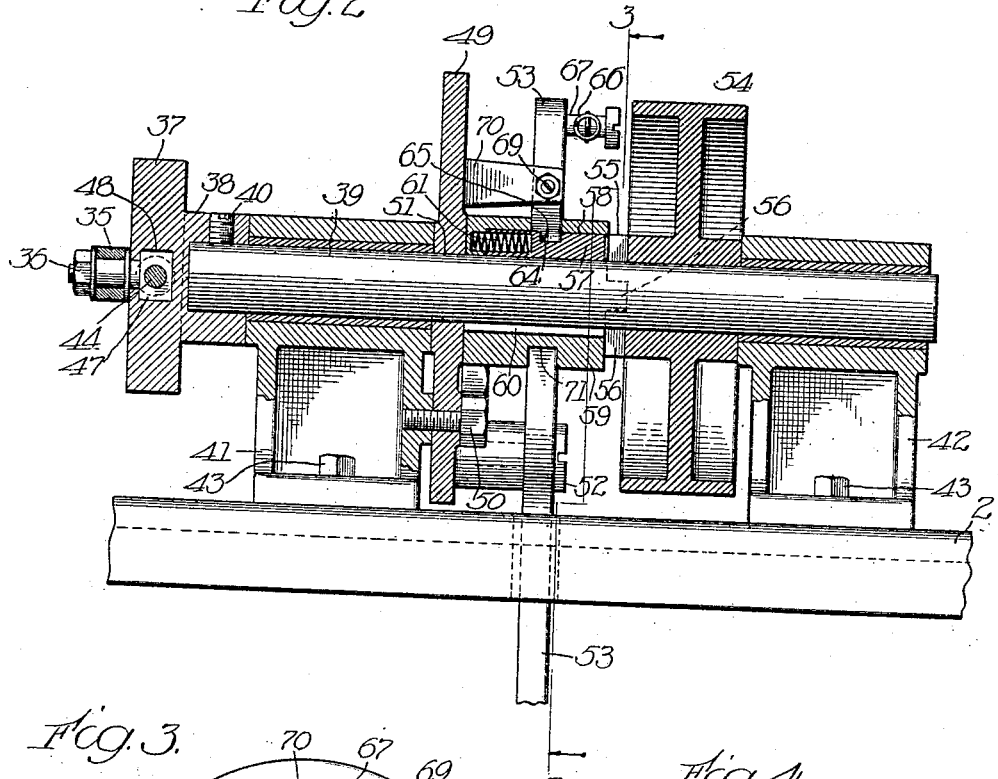
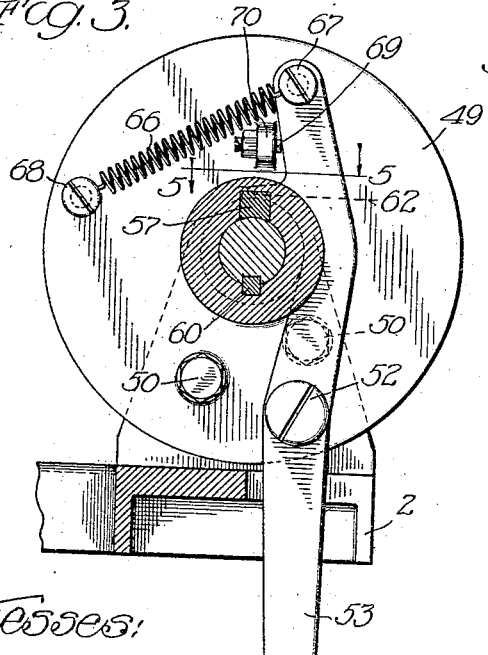
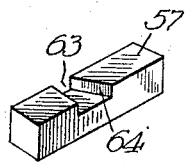
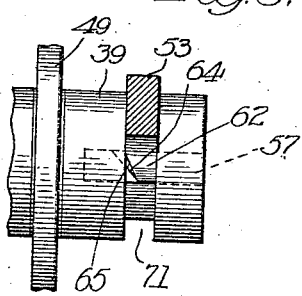
Witnesses:
Robert H. Weir
Seymour S. Gilbert
Inventor:
Oscar A. Anderson
By J. Warner Beckstrom
His Atty

UNITED STATES PATENT OFFICE.

OSCAR A. ANDERSON, OF CHICAGO, ILLINOIS.

RIVETING-MACHINE.

945,670.  Specification of Letters Patent.  Patented Jan. 4, 1910.

Application filed May 17, 1909. Serial No. 496,614.

*To all whom it may concern:*

Be it known that I, OSCAR A. ANDERSON, a citizen of the United States, residing at Chicago, in the county of Cook and State of Illinois, have invented certain new and useful Improvements in Riveting-Machines, of which the following is a specification.

My invention relates to machines for assembling parts of folding rulers and has particular reference to the mechanism for inserting and temporarily fastening the joint-rivets or pivots thereof.

The object of the invention is to provide a simple and rapidly operable machine for fastening together the pivoted sections of a pocket rule and the like in such a manner as to obviate waste of time and loss of material usually occasioned in the inefficient assembling of ruler sections prior to the permanent riveting or heading of the joint pivots, and the invention consists in the novel construction, combination and arrangement of parts hereinafter described in detail, illustrated in the drawings and incorporated in the appended claims.

In the drawings—Figure 1 is a plan view of a machine embodying my invention same being partly in section. Fig. 2 is a vertical section of the driving mechanism. Fig. 3 is a section taken on line 3—3 of Fig. 2. Figs. 4 and 7 are enlarged detail views. Fig. 5 is a section taken substantially on line 5—5 of Fig. 3. Fig. 6 is a section taken on line 6—6 of Fig. 1.

Referring in a general way to Fig. 1, 2 represents the base of the machine, which is substantially a flat plate forming a right angle and adapted to be placed on a table top or bench. Fig. 2 and the upper portion of Fig. 1 represent an adjustable driving mechanism which is set in motion by stepping on a treadle and stops automatically at the end of each complete operation of checking or slightly heading the ends of a joint rivet, which operation is completed during one complete revolution of the driving shaft. The rivet-checking mechanism receiving power from said driving mechanism, is represented by the lower portion of Fig. 1. In the latter is shown a yieldingly mounted spindle, pin or finger 3 the diameter of which is substantially that of a joint-pivot or rivet. Upon this spindle the rule-sections to be pivoted together are temporarily mounted or joined while the machine inserts a permanent rivet or pivot which replaces said spindle or temporary pivot by pushing it out of the rivet holes in the rule sections. When the rivet is entirely through the joint the spindle 3 has reached the end of its movement and its forcible resistance then checks or dents or slightly heads that end of the rivet with which it contacts while the opposite end of the rivet is similarly operated upon by a somewhat similar rivet-pushing spindle alined with said spindle 3 the outer end of which is mounted in a bore 5 of a socket-piece or rivet-holding member 4. The rule sections are represented by the numerals 6 and 6' and the spindle which coöperates with the spindle 3 in slightly heading the pivot is represented by the numeral 7 and its outer end is shown mounted in the bore 5 of the socket piece 4, the outer, or unoccupied portion, of said bore 5 being a receptacle for the permanent rivet while it is being inserted in the rule joint.

Referring, now, in detail to the construction of the checking device and its driving mechanism as shown in the different views, the spindle 3 is mounted in a bearing composed of an upper plate 8 and a lower plate substantially similar, not shown specifically but substantially represented in Fig. 6 by the plates marked therein 8' and 9. In Fig. 1 the plate 8 and its counterpart represented by the plate 9 in Fig. 6, are secured together by screws 10. These bearing plates are hollowed out so as to form between them a bore 11 the outer or lower end of which is closed by a cylindrical stop 13, or a plug provided with threads 15 which engage threads 16 in a counterbored portion 14 of the bore 11. Within the latter and securely mounted on the spindle 3 is a cylindrical enlargement or stop 12 through which the spindle 3 is continued rearwardly of said stop 12 in the form of a guide spindle 18 movable in a bore 19 in the plug 13 the threaded portion of which is provided with a screw driver slot 17 with the aid of which the plug 13 may be turned in or out to vary the extent of movement of the spindle 3, or the point of contact and arrest of movement of its stop 12. In the bore 19 of the plug 13 is seated a spiral spring 20 and the upper end of said spring is coiled around the guide spindle 18. The extreme upper end of said spring bears against the stop 12 of the spindle 3 and normally supports the latter in its projected position ready to receive thereon the rule sections, as shown in Fig. 1. The spindle 18 supports that portion of the spring 20 which projects out of the bore 19, against lateral displacement and thus guides the upper end of the spring into the bore when the spring is compressed during the movement when the spindle 3 is displaced by a permanent pivot or rivet.

The rivet-holder, or socket member 4, together with its immediate mountings is carried upon a cross-head 21 having side-bearings 22 and 23 slidably mounted in grooves or channels 24 and 25 formed between the plates 8' and 9 by rabbeting their inner adjacent edges as shown in Fig. 6. The rivet-holder 4 is mounted in a horizontal bore 28 in a hub 27 projecting from a cap 26 secured by screws 31 to the forward end of the cross-head 21. The rivet-holding member 4 is mounted in a manner similar to the spindle 3, its inner end 29 being enlarged and serving as a stop limiting the outward movement of the rivet-holder. The outer end of the bore 28 is reduced to correspond with the size of the socket portion of the rivet-holding member 4 and between the reduced portion of the bore 28 and that portion in which the stop 29 is located an annular shoulder 30 is formed against which the stop portion 29 normally rests and is supported against the pressure of a spiral spring 33.

The spindle 7 is rigidly mounted in the cross-head 21, its inner end being an enlarged threaded portion 32 having threaded engagement with a threaded bore in the bottom of the bore 28. The spring 33 is coiled around the inner end of the spindle 7 and bears, respectively, against its enlarged inner end and against the stop 29 on the rivet-holder 4 which is thus, like the spindle 3, normally held projected under spring pressure so that its outer end extends beyond the tip of the spindle 7 and leaves a space beyond said tip in the bore 5 to be temporarily occupied by a rivet.

To a pivot-lug 34 on the rear end of the cross-head 21 is pivoted one end of a pitman 35. The opposite end of said pitman is pivoted to a wrist-pin 36 adjustably mounted, in a manner to be hereinafter described, to vary the length of its radius, or the length of movement of the cross-head 21. The wrist pin 36 is on a shaft-head or disk 37 having a hollow hub 38 mounted on the end of a driving-shaft 39 and secured to said shaft by a set-screw 40 or any other suitable means. The driving-shaft 39 is mounted in bearings 41 and 42 which rise from the base 2 and are secured thereto by bolts 43. The wrist-pin is adjustable radially with respect to the axis of the driving-shaft by means of a screw 44 the outer end of which is mounted against longitudinal movement in a plate 45 secured by screws 46 to the member 37 and curved to correspond with the curvature of said member. The inner end of the screw 44 is swiveled onto a bearing 47 which is mounted in a channel 48 extending radially in said head 37. By turning the screw 44 the throw of the wrist-pin may be varied and the extent of movement of the spindle 7 nicely adjusted for the purpose of properly mashing or slightly heading the rivet and to adjust the movement of said rivet with the aid of the adjustment provided for the spindle 3, so as to position the rivet properly in the rivet-holes of the rule sections.

To the bearing 41 is secured a disk 49, the latter being fastened to the bearing by means of bolts or screws 50 50. In this disk is an opening 51 through which the shaft 39 passes. The disk 49 serves as a bearing-member and to it, at 52, is fulcrumed a lever 53 which may be operated by foot power or any suitable or convenient means (not shown). A belt-pulley 54 is loosely mounted on the shaft 39 and is provided with a hub in the rim of which are a series of horizontal notches 56, 56 to be engaged by a slide-key or movable spline 57 which is mounted in a slot 58 formed in the inner periphery of a collar 59 secured by means of a key 60 to the shaft 39. The inner end of the slide-key 57 is placed under pressure of a spring 61 seated in a bore in the collar projecting from the bottom of the key seat, or the inner end of the latter. This spring 61 tends to force the slide key 57 outwardly so as to engage it with one of the notches 56 and thus connect the pulley 54 with the shaft 39. The slide-key 57 is normally held out of such engagement with the pulley 54 by means of a finger or spur 62 which projects from the lever 53 and engages a transverse slot 63 in the slide-key. This slot has a beveled surface or inclined wall 64 whose inclination is at an angle to the path of movement of the spur on the lever and is engaged by the latter which also has a beveled surface 65 which contacts with the beveled side 64 of the slide-key. When this spur is withdrawn from the slot 63 the spring 61 forces out the slide-key into engagement with one of the notches 56. The spur 62 is normally held in engagement with the slot of the key 57 and thus the latter held out of engagement with the hub of the pulley, by means of a spiral spring 66, one end of which is secured to a stud 67 projecting from the top of the lever 53 while the other end is secured to a similar stud 68 projecting from the face of the bearing-disk 49. An adjustable stop is provided for the upper end of the lever to gage the inward movement of the spur 62 in its engagement with the slide-key, which stop consists of a screw 69 mounted in a lug 70 extending from the face of the bearing-disk 49. The upper end of the lever 53 normally lies in an annular groove 71 formed in the collar 59, as shown in Figs. 1, 2 and 5. As shown in Fig. 3 the edge of the lever engaging this groove is curved in conformity with the curvature of the collar.

In operating the machine the operator hangs the rule sections 6 and 6' on the spindle 3 by passing said spindle through the rivet or pivot holes in the ends of the said sections, a permanent rivet is then inserted in the bore 5 of the rivet or pivot holder 4. The lever 53 is then moved to withdraw its spur 62 from its engagement with the slide-key 57, which permits the spring 61 to push the key into engagement with the first notch 56 that happens to be rotated into alinement with the key. This, as previously explained, imparts motion to the shaft 39, pitman 35 and cross-head 21, which carries forward the rivet-holding member 4 and spindle 7 with the permanent rivet. The latter when it meets the spindle 3 forces the spindle out of the rivet holes in the rule sections. That portion of the rivet which is held in the bore 5 is also permitted to advance into the rule sections, because when the tip of the rivet-holder 4 strikes the rule its motion is arrested while the spindle 7 continues to advance against the tension of the spring 33 until the tip of said spindle is about flush with the tip of the holder 4, at which moment the tip of the spindle 3 will be out of the rivet holes in the rule sections, its stop 12 resisted by the plug 13, and the rivet ends substantially flush with the opposite sides of the jointed rule sections. A slight additional movement will then cause the tips of the spindles 3 and 7 to check or partly rivet the opposite ends of the rivet or pivot. This done the forward movement of the cross-head is completed and on its return the jointed rule sections will drop down into a suitable receptacle below (not shown) from whence they can be removed for further operation.

While the foregoing has explained a temporary riveting operation it is obvious that the same mechanism is capable of completing the heading of the rivets by providing rivets of suitable material and tips for the spindles 3 and 7 particularly suited to form complete heads under the pressures which they are caused to exert.

The degree of crushing force applied to the rivet ends is controlled by the adjustment radially of the wrist-pin 36 as to the spindle 7, and adjustment of the plug 13 as to the spindle 3. The motion of the shaft is automatically stopped at the end of its single rotation by the spur on the lever lying in the path of the slide-key, so that when the latter is revolved to its starting point it is engaged by the spur and forced out of engagement with the pulley, so all the operator need do is to start the motion by a momentary pressure upon the lever, the stopping at the right point taking place without any further effort on the operator's part. The operations of inserting and heading rivets may thus be accomplished with great rapidity as all the operator needs to do is to insert a rivet in the holder 4 mount the rule sections on the spindle 3 and step on a treadle or other device to actuate the lever 53. The spindle 3 I term the "mounting-pin" and the spindle 7 the "punch" or heading pin, each being, as shown, mounted within socket members formed by the upper and lower plate cavities within which the springs for the punch 3 and the rivet-holding socket 4 are, respectively, mounted.

I claim as my invention—

1. In a machine of the class described, the combination with a spindle adapted to temporarily mount a rule-joint, of a rivet-holding device, a spindle movable against a rivet in said device, and means for moving same.

2. In a machine of the class described, in combination, a movable mounting pin adapted to serve as a temporary pivot, a rivet-holding socket, a punch movable into said socket, and means for moving said punch to force a rivet out of said socket against said mounting-pin.

3. In a machine of the class described, the combination with a yieldingly mounted mounting-pin, of a slide, a rivet-punch mounted on said slide, a rivet-holding socket mounted in line with said punch, means for reciprocating said slide, and automatic means for stopping the motion of the slide at the completion of each forward and return movement.

4. In a machine of the class described, the combination with a longitudinally movable mounting-pin, of means for adjusting the extent of movement of said pin, a punch, a slide upon which said punch is mounted, means for temporarily supporting a rivet in alinement with said punch, and means for moving said punch to force a rivet against said mounting-pin.

5. In a machine of the class described, the combination with a mounting-pin yieldingly mounted, of means for adjusting its normal position, a slide, a punch mounted on said slide in alinement with said pin, a rivet holding socket adapted to support a rivet temporarily and mounted concentrically with said punch, means for reciprocating said punch, means for adjusting the stroke of its reciprocal movement, and means for stopping such movement automatically.

6. In a machine of the class described, the combination with a base, of a socket-member, a movable spring-pressed spindle mounted in said socket and adapted to engage the rivet-holes of a rule-joint, a cross-head, a punch mounted on said cross-head, a spring-pressed rivet-supporting socket within which the end of said punch is mounted, a means for reciprocating said cross-head, means for varying the length of stroke of the reciprocal movement of said cross-head, a shaft, a pulley rotatably mounted on said shaft, means for connecting said shaft to rotate with said pulley, and means which automatically disconnect said shaft and pulley at the end of each complete reciprocal movement.

In testimony whereof I have hereunto set my hand in the presence of two subscribing witnesses.

OSCAR A. ANDERSON.

Witnesses:
 OTTO GROTH,
 M. C. ALLEN.